United States Patent [19]
Naito et al.

[11] Patent Number: 5,629,745
[45] Date of Patent: May 13, 1997

[54] TELEVISION CABINET

[75] Inventors: Ryoji Naito, Tokyo; Yumi Imaizumi, Saitama; Scott Pinizzotto, Tokyo, all of Japan

[73] Assignee: Sony Corporation, Tokyo, Japan

[21] Appl. No.: 489,596

[22] Filed: Jun. 12, 1995

[30] Foreign Application Priority Data

Jun. 17, 1994 [JP] Japan ........................ 6-15838

[51] Int. Cl.⁶ .................. B29C 45/00; B29D 22/00; H04N 5/64
[52] U.S. Cl. ........................ 348/836; 264/572
[58] Field of Search .................. 348/836, 837, 348/838, 840, 843; 264/572, 531, 523; 312/7.2; 361/728, 730, 752, 814, 681, 682; 425/4 R

[56] References Cited

U.S. PATENT DOCUMENTS

| | | | |
|---|---|---|---|
| 5,162,230 | 11/1992 | Ziegler et al. | 264/537 |
| 5,173,241 | 12/1992 | Shibuya et al. | 264/527 |
| 5,262,105 | 11/1993 | Komiyama et al. | 264/572 |
| 5,324,189 | 6/1994 | Hendry | 264/527 |
| 5,387,391 | 2/1995 | Satoh et al. | 264/572 |
| 5,488,427 | 1/1996 | Kayashima et al. | 348/836 |

Primary Examiner—Kim Vu
Assistant Examiner—Fan Lee
Attorney, Agent, or Firm—Jay H. Maioli

[57] ABSTRACT

A cabinet forming a casing for electronic equipment molded integrally by blow molding, includes a first panel formed to a substantially uniform thickness, a second panel formed to a thickness substantially equal with that of the first panel, and a corner portion formed to a thickness substantially equal with that of the first panel and the second panel and having a cylindrical hollow portion.

9 Claims, 6 Drawing Sheets

10

TELEVISION CABINET

BACKGROUND OF THE INVENTION

1. Field of the Invention

The present invention relates to a television cabinet for forming a casing of a television receiver.

2. Description of Related Art

A cabinet for forming a casing, for example, of a television receiver comprises a front enclosure to which a CRT or the like is mounted and a rear enclosure through which various kinds of terminals, for example, video or audio input/output terminals are passed. The front enclosure and the rear enclosure comprise a top plate, side plates and a bottom plate molded integrally.

FIGS. 3 and 4 show one example of a front enclosure. FIG. 3 is a front elevational view. FIG. 4 is a perspective view as viewed from the back. In the figures, are shown a front enclosure 30, a bottom plate 31, a top plate 32, side plates 33 and 34 and a front plate 35.

Below the front plate 35, are provided a speaker grill 37 for protecting a loud speaker, a control portion 38 having apertures disposed for various kinds of control keys (for example, for power on/off, channel up/down, volume up/down or headphone terminals, and an opening 39 for attaching a loud speaker for a left hand voice channel in a case of a two-channel stereophonic television receiver. The opening 39 is adapted such that it may be covered by a predetermined lid in a case of a monaural television receiver, for example, or covered with a speaker grill of a shape symmetrical with the speaker grill 37 in a case of a stereophonic television receiver.

An injection trace 40 denotes a trace through which a resin is injected upon molding of the front enclosure 30. That is, the front enclosure 30 is molded integrally by injecting a resin from an injection port at a position of the injection trace 40 which is left after injection of the resin into a die, casting the resin as far as the end faces of the bottom plate 31, the top plate 32, and the side plates 33 and 34 and then removing the die.

As shown in FIG. 5, illustrating a partial cross sectional view along line C—C' of the top plate 32, the top plate 32 is molded such that the wall thickness d at the end face of the top plate 32 is made greater than the wall thickness c for a portion contiguous with the front panel 35 and a flow of the resin (for example, a polyester resin) is injected into the die upon molding. This is so adapted for lowering the pressure of the resin at the end face since the pressure of the resin injected from the injection port is in an inverse proportion to the cross sectional area of the die in which the resin flows.

That is, if the thickness d for the end face is made greater than the thickness c for the contiguous portion, the resin injected from the injection port can flow sufficiently as far as the top end of the die where the pressure is low, thereby molding the a front enclosure to a high accuracy.

Although not illustrated as a cross section, the thickness at the end face of the side plates 33 and 34 is made greater than the thickness d at the end face of the top plate 32, such that the thickness of the end faces of the side plates 33 and 34 is greater than the thickness for the contiguous portion of the front plate 35.

The contents of the above-mentioned technique are disclosed in the following three Japanese Patent Applications, i.e., Japanese Utility Model Laid Open Publication No. 02-046480, Japanese Patent Laid-Open Publication No. 62-292415 and Japanese Patent Laid-Open Publication No. 63-240469.

Incidentally, blow molding has been employed recently as a method of blowing the front enclosure 30 or the like. FIG. 6 schematically shows the outline of blow molding. In the figure, are shown a die 50, a cylinder 51 for injecting a resin J at a predetermined pressure to the die 50, a gas reservoir 52, a gas cylinder 53 having a piston P for compressing a gas G (for example, nitrogen) sent from the gas reservoir 52 and valves V1, V2 and V3 for controlling the gas flow. In the blow molding of the above-mentioned constitution, the resin J is injected in a previously calculated predetermined amount through an injection port 50a of the die 50 from the cylinder 51 and then the gas G is sent in the same manner after a predetermined delay from the injection port 50a to form a hollow structure.

At first, the gas G is injected into the gas cylinder 53 by opening the valve V1 and then the valve V1 is closed again. Then, the gas G is compressed by the piston P, and the valve V2 is opened at a predetermined timing. Then, the gas G forms predetermined hollow portions depending on the solidified state of the resin J and the wall thickness of the resin J injected into the die 50. Then, after the forming of the hollow portion, the gas valve V3 is opened to release the gas to the outside.

That is, by molding the hollow portion by the injection of the gas G, a structure of an increased thickness can be formed in specified regions which was difficult by usual molding and, for instance, a portion for mounting to support a CRT can be made more rigid, for example, in a case of the front enclosure 30.

However, in a case of using the blow molding method described above, if the thickness for the top plate 32 and the side plates 33 and 34 is not molded uniformly, only the flow of the resin J in the die 50 is considered. Then, if blow molding is conducted with such a wall thickness this will not provide constant resin pressure, the injected gas G will flow to a section with a larger thickness, that is, toward the end face at a lower resin pressure.

That is, the injected gas G cannot be controlled well and the gas G escaping from a section causes defects such as puncture from the inside to the surface of the front enclosure 30 or sink marks (hollow shape appearing on the surface by the gas G). Accordingly, this brings about a problem of reducing the strength of the front enclosure 30 and increasing the number of failed products.

SUMMARY OF THE INVENTION

The foregoing problems can be solved according to the present invention by forming a casing for electronic equipment, for example a television cabinet integrally molded by blow molding, comprising a first panel molded to a substantially uniform thickness, a second panel molded to a thickness substantially equal with that of the first panel, and a corner portion molded to a thickness substantially equal with that of the first panel and the second panel and having a cylindrical hollow portion.

In preferred embodiments of the present invention, a gas channel is molded to a continuous portion between the top plate and the front plate, and a continuous portion between the side plate and the front plate. The thickness of the gas channel is made greater than that of the top plate and the side plate.

As described above, in the television cabinet according to the present invention, the gas can be controlled easily and accurately upon conducting blow molding by making the thickness, for example, of the top plate and the side plate uniform and by providing the gas channel with a thickness greater than that of the top plate and the side plate.

Accordingly, this can prevent defects, for example, puncture from the inside or occurrence of sink marks caused by escape of the injected gas from its intended position. This can greatly reduce the number of defective molding products. Further, it also increases the speed of molding cycles for television receiver cabinets by a blow molding machine.

DETAILED DESCRIPTION OF PREFERRED EMBODIMENTS

Description will be made to embodiments in which the present invention is applied to a front enclosure of a television receiver as a preferred embodiment of a television cabinet.

Figure 1:
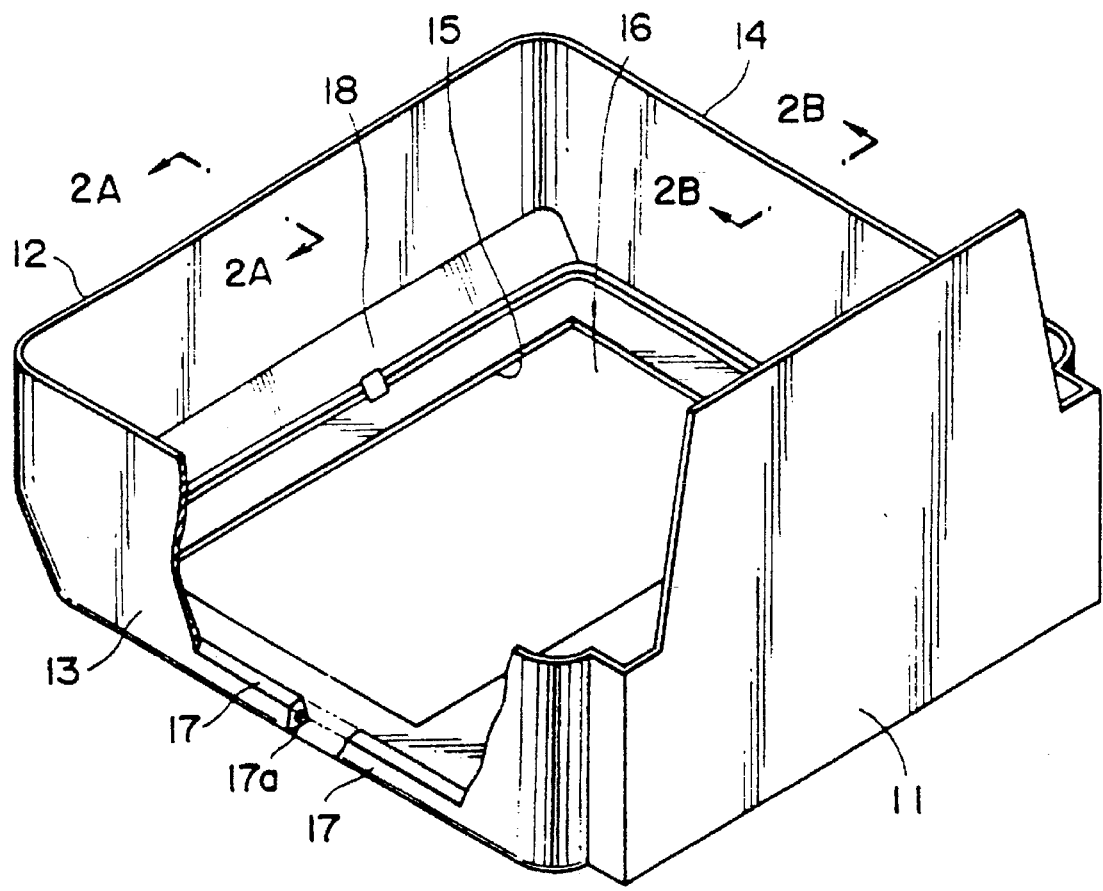
FIG. 1 is a perspective view illustrating a front enclosure at the back of a preferred embodiment according to the present invention.
Figure 2A:
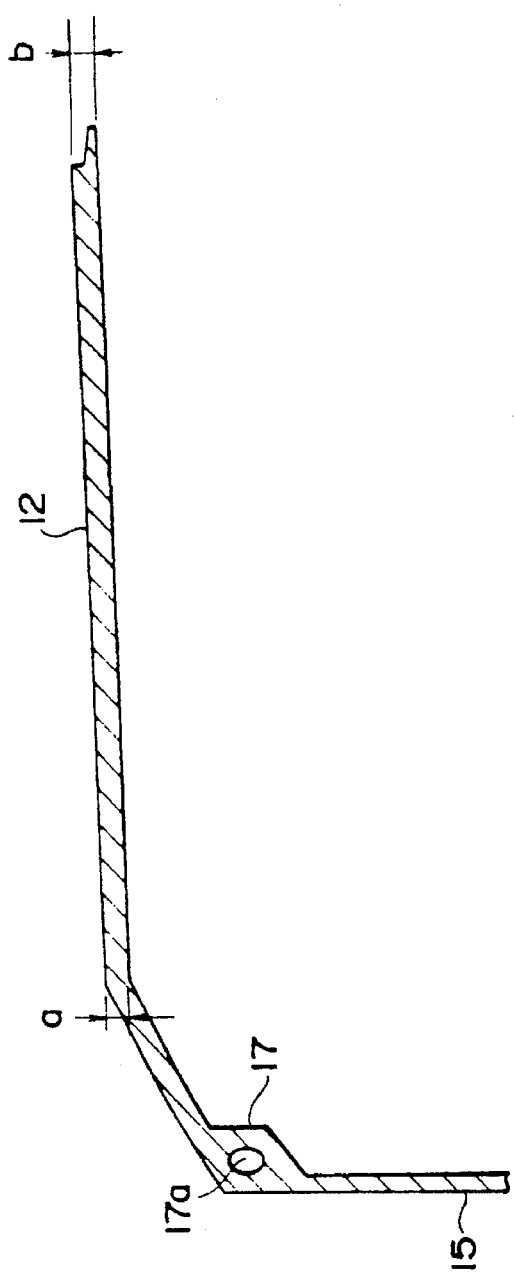
FIGS. 2A and 2B are cross sectional views for a top plate and side plates of a front enclosure in the preferred embodiment.
Figure 2B:
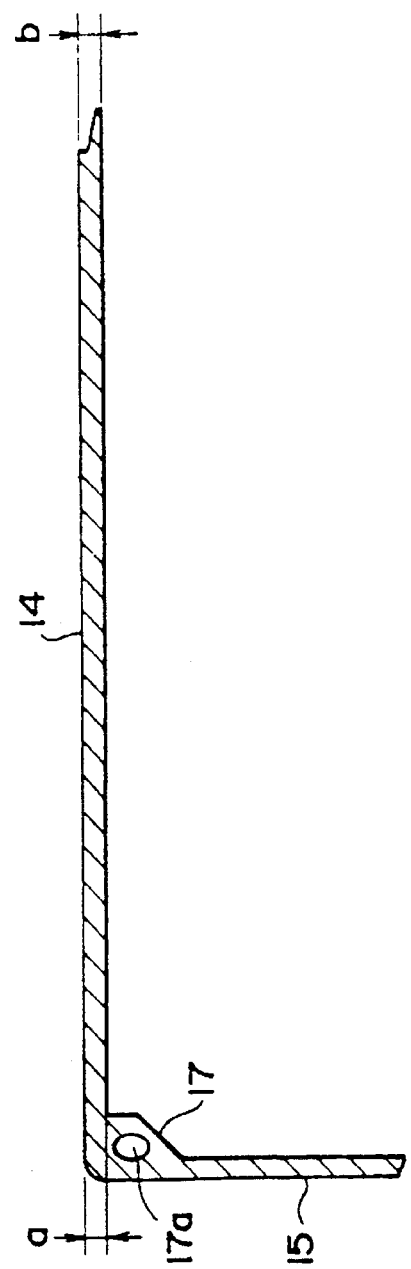

FIG. 1 is a perspective view illustrating a front enclosure from the back of the enclosure. FIGS. 2A and 2B are cross sectional views taken along lines A—A' and B—B' in FIG. 1. In the drawings, are shown a front enclosure 10, a bottom plate 11, a top plate 12, side plates 13 and 14, a front panel 15, and an opening 16 through which a display portion of a CRT is exposed. In the drawings, the side plate 13 is partially cut away.

A gas channel 17 has a continuous hollow portion 17a formed with a gas injected during blow molding. The gas channel 17 is fabricated to a die such that it is formed to a portion where the front plate 15 is continuous along the top plate 12, the side plates 13 and 14, and the bottom plate 11. That is, the thickness of the gas channel 17 is made greater than that of the side plates 13, 14 and the top plate 12. Reference numeral 18 denotes an injection trace in communication with the gas channel 17 and through which the resin is injected upon molding of the front enclosure 10.

Figure 3:
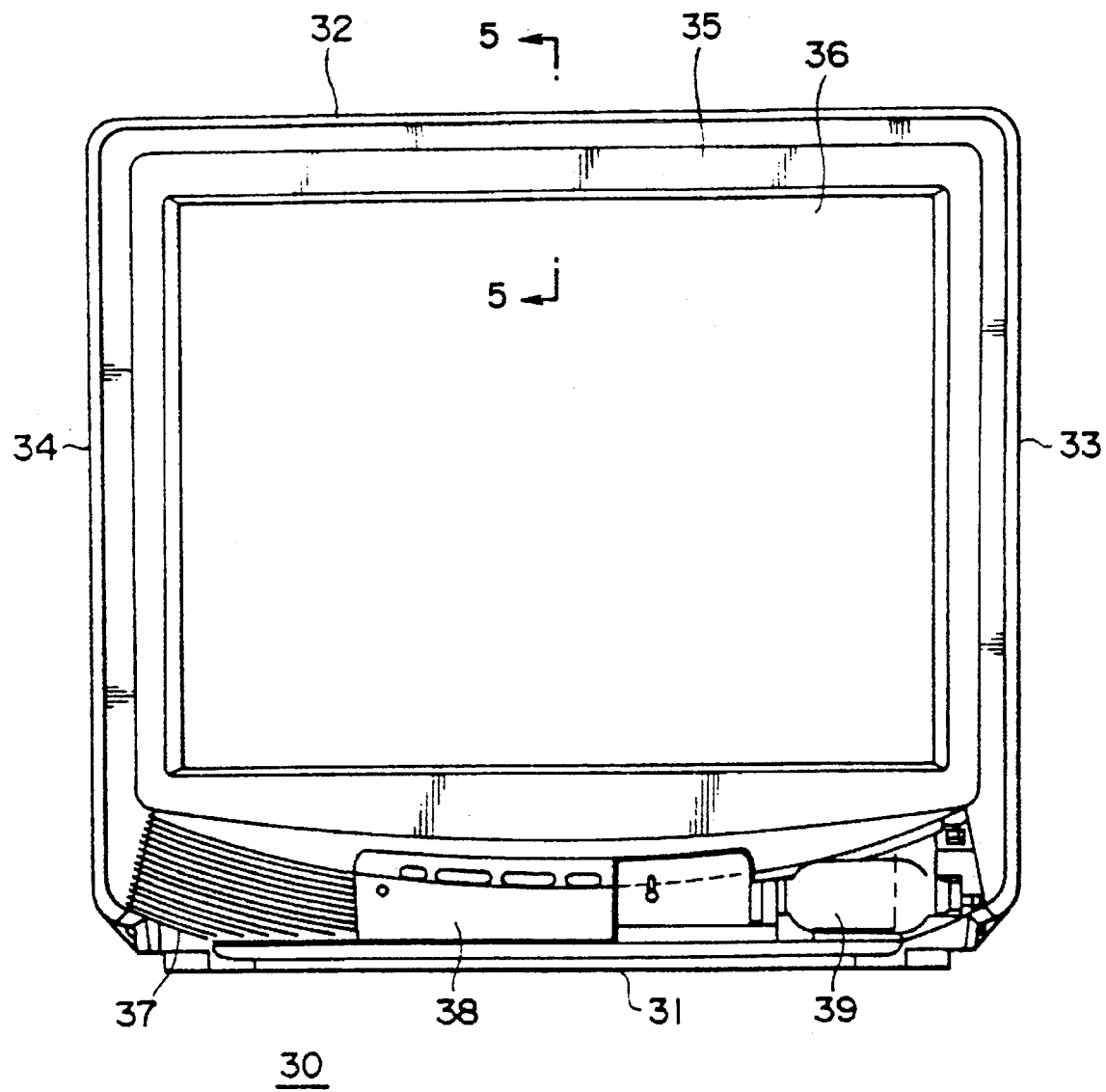
FIG. 3 is a front elevational view of a front enclosure in a usual television receiver.
Figure 4:
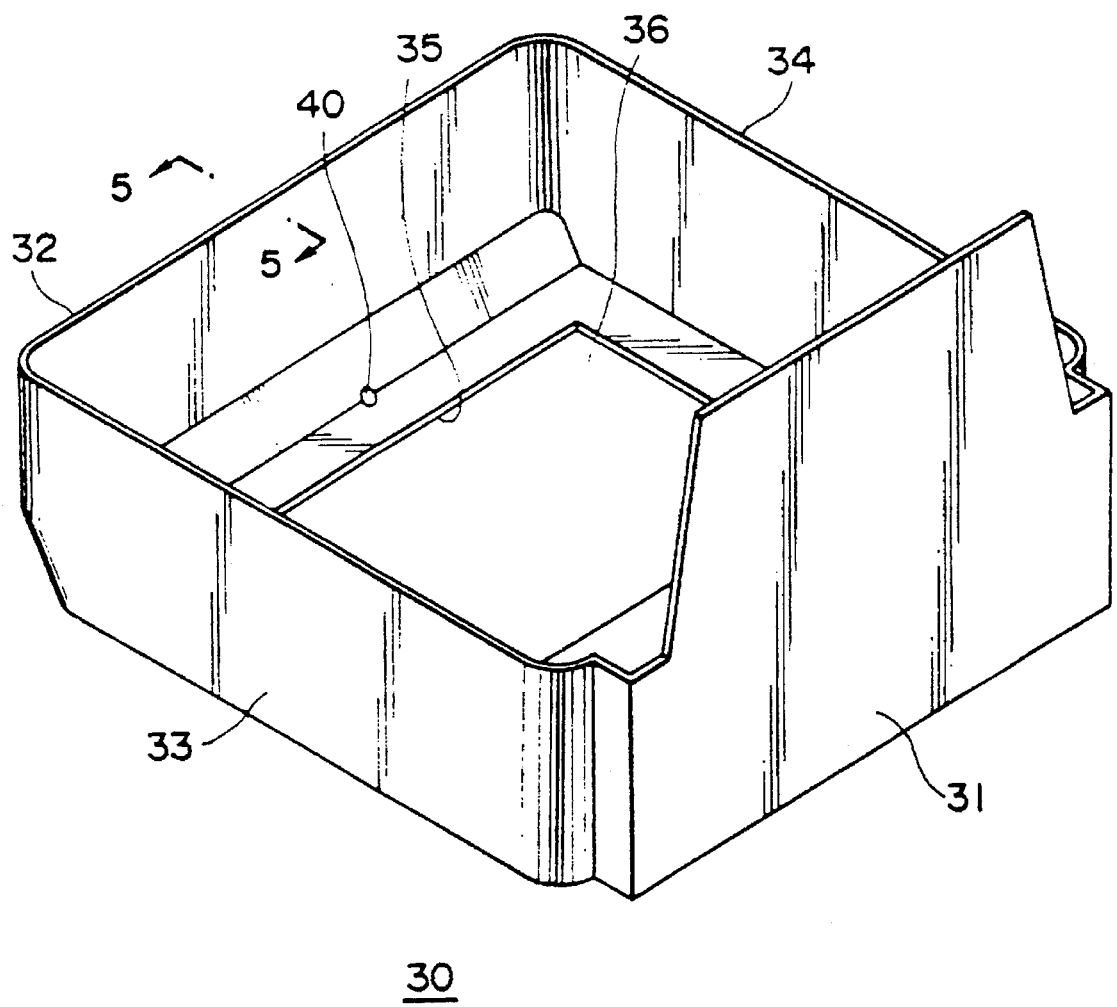
FIG. 4 is a perspective view illustrating the back of the relevant front enclosure.

Openings each of the shape similar with the speaker grill 37, the manipulation portion 38 and the opening 39 shown in FIG. 3 are disposed near the bottom plate 11 below the front panel 15 although not illustrated.

In this embodiment, the top plate 12 is molded, for example, as shown in the cross sectional view taken along line A—A' in FIG. 2A, such that the wall thickness b at the end face of the top plate 12 is equal with the wall thickness a for a portion contiguous with the front plate 15. That is, by making the wall thickness b of the end face equal with the wall thickness a of the continuous portion, the resin pressure upon molding is made uniform from the end face to the continuous portion. Further, by providing the gas channel 17 to the continuous portion such that the thickness is made greater than the wall thickness a and b of the top plate 12, the resin pressure of the gas channel 17 is reduced, and the gas injected upon molding flows in the gas channel 17.

Further, as shown in the cross sectional view taken along line b—b' in FIG. 2B, the wall thickness of the side plate 14 is formed at a thickness equal with the wall thickness a and b of the top plate 12, and the gas channel 17 is provided to the continuous portion such that the thickness of the gas channel is greater than that of the side plate 14. Although the cross sectional view is not illustrated, the side plate 13 is molded to a thickness equal with that of the side plate 14 and the gas channel 17 is provided to a continuous portion contiguous with the front panel 15.

Figure 5:
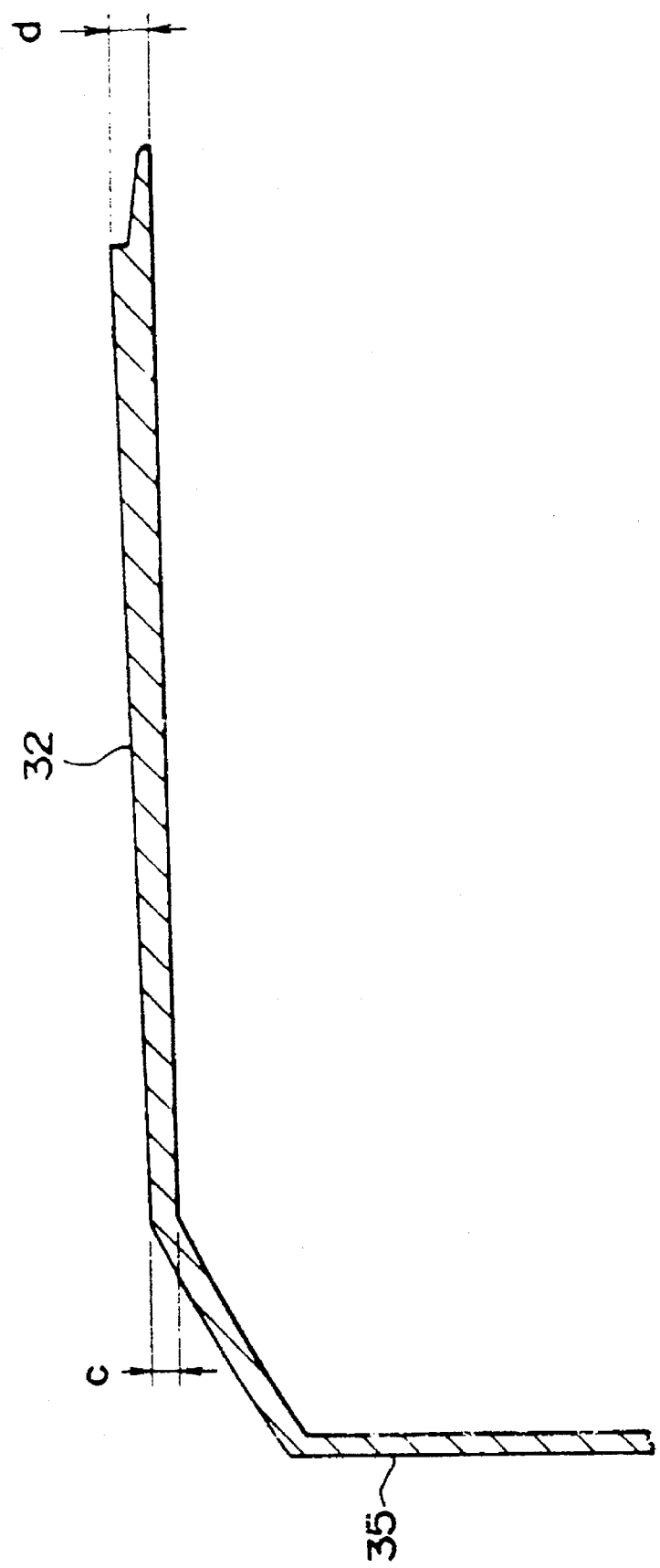
FIG. 5 is a cross sectional view for a portion of a top plate of the relevant front enclosure.
Figure 6:
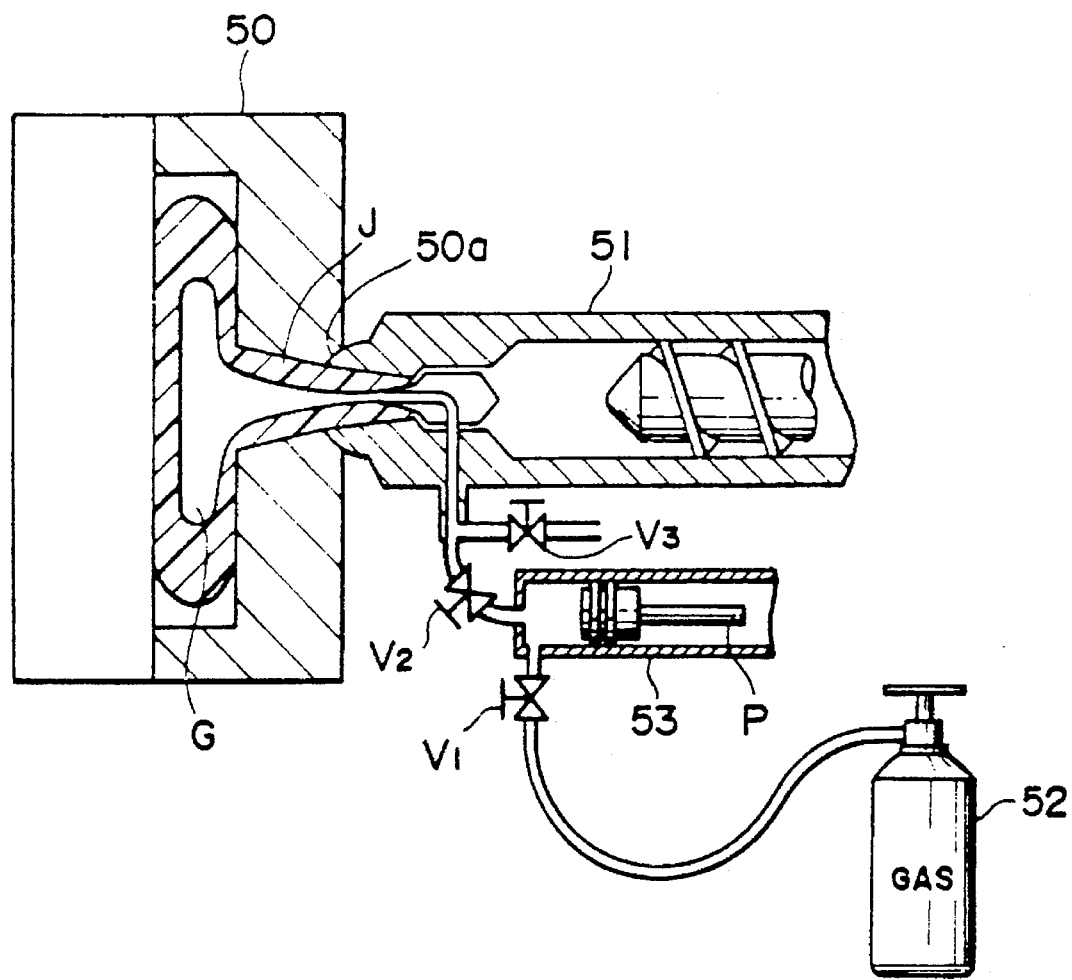
FIG. 6 is a schematic view illustrating the outline of a blow molding method.

Even if the cross section of the top plate 32, as shown in FIG. 5, is not uniform between the continuous portion between the top plate and the side plates 33 and 34 and the end portion, the resin may possibly flow toward the end face at a lower resin pressure. However, the gas flows in the gas channel 17, shown in FIG. 1, to regulate gas flow by making the wall thickness greater for the continuous portion of the top plate 12 and the side plates 13 and 14 to stabilize the resin pressure.

That is, if the gas channel 17 is provided as in this embodiment, the injected gas flows surely in the gas channel 17 at a low resin pressure, so that the gas does not jet out, for example, to the end face of the top plate 12 and the side plates 13 and 14, thereby enabling to prevent the gas from flowing to portions other than the gas channel 17.

Further, since the hollow portion 17a is formed to the gas channel 17, this can increase the strength of the front enclosure 10, and improve the reliability of the cabinet especially by disposing the gas channel 17 near a portion for supporting a CRT.

The top plate 12, the side plate 13 and the end face 14 vary in size depending on the size of the cabinet as shown below. Further, the hollow portion 17a has a substantially elliptic shape as shown in FIGS. 2A and 2B and the minimum diameter of the ellipse is formed to a thickness substantially equal with the wall thickness of the cabinet.

| Cabinet size (inch) | Plate thickness (mm) | Min. dia. for hollow portion |
| --- | --- | --- |
| 10 | 2.5 | 1.5 times of the plate thickness |
| 20 | 3.0 | 1.5 times of the plate thickness |
| 30 | 3.5 | 1.5 times of the plate thickness |

Further, productivity of molding cabinets, particularly, for large sized equipment can be improved by disposing the gas channel 17, thereby enabling easy and accurate gas control.

Further, the gas channel 17 may not always be formed continuously as illustrated in this embodiment but it may be disposed, for example, only at corner portions, or it may be molded to other than the corner portions. Further, although the explanation has been made for this embodiment to a case of providing the gas channel 17 to the front enclosure 10, the wall thickness of the side plate and the top plate of the rear enclosure may be made equal and the gas channel 17 may be disposed on a rear enclosure in the same manner. Further, the present invention is applicable not only to cabinets for the television receivers but also to other molding products molded by blow molding.

What is claimed is:

1. A cabinet forming a casing molded integrally by blow molding, comprising:

a first panel having an edge at one end and a continuous portion at an opposite end and formed to a substantially uniform thickness from the one end to the opposite end from a molding resin;

a second panel connected to said continuous portion and formed to a substantially uniform thickness from one end to an opposite end, the thickness being substantially equal to that of the first panel from the molding resin; and a gas channel formed from the molding resin adjacent said continuous portion and formed to a thickness greater than the thicknesses of the first panel and the second panel, whereby a pressure of the resin is reduced at said gas channel so as to form a substantially uniform thickness in said first and second panels during the blow molding process.

2. A cabinet as defined in claim 1, wherein the gas channel includes a hollow cylindrical cavity at a predetermined position to regulate gas flow during blow molding by containing the injected gas in said cavity.

3. A cabinet as defined in claim 2, further comprising:

a third panel connected to said second panel at a first end and having an edge at an opposite second end;

a fourth panel parallel to said third panel and connected to said second panel at a first end and having an edge at an opposite second end; and a fifth panel parallel to said first panel and connected to said second panel at a first end and having an edge at an opposite second end, wherein said third panel, fourth panel and fifth panel are molded to a uniform thickness from the molding resin and said gas channel is disposed continuously along a perimeter of said second panel where said second panel respectively connects to said first panel, said third panel, said fourth panel and said fifth panel.

4. A cabinet as defined in claim 3, wherein the gas channel is formed to a thickness greater than any of said first panel, second panel, third panel, fourth panel or fifth panel.

5. A cabinet as defined in claim 4, wherein the cabinet supports a CRT monitor.

6. A cabinet as defined in claim 5, wherein the gas channel is molded proximate to the panel that bears most of the weight of the CRT monitor.

7. A process for forming a casing by blow-molding comprising the steps of:

forming a molded section for a first panel with substantially uniform thickness from an entrance to an end face opposite said entrance;

forming a molded section for a second panel with substantially uniform thickness substantially equal to the thickness of the first panel from an entrance to an end face such that a longitudinal corner portion is formed between said first and second panel molded sections so as to be contiguous with and substantially parallel to the entrance of each of said first and second panel molded sections;

forming a molded section for a gas channel adjacent the longitudinal corner portion and located proximate the entrances of the first and second panel molded sections so that the thickness of the gas channel is greater than the thicknesses of the first and second panels;

introducing a molding resin into mold sections forming the corner section and said gas channel; and forcing the molding resin into mold sections forming the entrances of the first and second panel sections by pressure from a gas introduced into the mold section forming the gas channel, whereby the molding resin flows into mold sections forming the end faces of the first and second panel molded sections and forms the first and second panel molded sections completely with a substantially uniform thickness.

8. A process as defined in claim 7 comprising the further steps of disposing a third panel molded section of uniform thickness contiguous with one of the first panel molded section or the second panel molded section.

9. A process as defined in claim 8 further including the steps of forming the molded section for the gas channel with a thickness greater than any of the molded sections forming the first, second or third panels.

* * * * *